United States Patent
Shintani

(10) Patent No.: US 9,350,890 B2
(45) Date of Patent: May 24, 2016

(54) IMAGE FORMING APPARATUS AND CONTROL METHOD FOR THE IMAGE FORMING APPARATUS

(71) Applicant: KYOCERA DOCUMENT SOLUTIONS INC., Osaka (JP)

(72) Inventor: Yoshihisa Shintani, Osaka (JP)

(73) Assignee: KYOCERA DOCUMENT SOLUTIONS, Osaka (JP)

( * ) Notice: Subject to any disclaimer, the term of this patent is extended or adjusted under 35 U.S.C. 154(b) by 8 days.

(21) Appl. No.: 13/853,213

(22) Filed: Mar. 29, 2013

(65) Prior Publication Data

US 2013/0258409 A1    Oct. 3, 2013

(30) Foreign Application Priority Data

Mar. 30, 2012  (JP) ................. 2012-079123

(51) Int. Cl.
*H04N 1/00* (2006.01)
*G06K 15/00* (2006.01)
*G06F 3/12* (2006.01)

(52) U.S. Cl.
CPC ....... *H04N 1/00928* (2013.01); *H04N 1/00915* (2013.01); *H04N 2201/0094* (2013.01)

(58) Field of Classification Search
CPC ....... G06K 15/00; B41J 3/00; H04N 1/00928; H04N 1/00938; H04N 1/00915; G10L 15/01
See application file for complete search history.

(56) References Cited

U.S. PATENT DOCUMENTS

| 5,923,826 A | * | 7/1999 | Grzenda | ................ | G06F 13/00 395/114 |
| 2006/0075150 A1 | * | 4/2006 | Hwang | .................... | H04N 1/00 710/14 |

(Continued)

FOREIGN PATENT DOCUMENTS

JP    2002-185659 A    6/2002

OTHER PUBLICATIONS

English Abstract and Translation for JP 2002-185659 A, published Jun. 28, 2002.

*Primary Examiner* — Marivelisse Santiago Cordero
*Assistant Examiner* — Daryl Jackson
(74) *Attorney, Agent, or Firm* — Polisinelli PC

(57) ABSTRACT

An image forming apparatus capable of improving convenience for a user is provided. This image forming apparatus includes: a non-volatile storage portion that stores beforehand each snapshot picked out from a plurality of snapshots which are obtained by dividing an image when firmware for executing a plurality of kinds of jobs is deployed; a priority storage portion that stores priorities when putting the plurality of kinds of jobs into an executable state; an operation portion that accepts a setting change of the priority to be stored into the priority storage portion; and a volatile storage portion that at a power input time, based on the priorities stored in the priority storage portion, acquires and deploys a snapshot necessary for execution of each job in an order of a highest-priority job to a lowest-priority job, thereby putting first the job having the highest priority into the executable state.

3 Claims, 8 Drawing Sheets

(56) References Cited

U.S. PATENT DOCUMENTS

| | | | |
|---|---|---|---|
| 2006/0187488 A1* | 8/2006 | Sakamoto | 358/1.18 |
| 2007/0206211 A1* | 9/2007 | Okutsu et al. | 358/1.14 |
| 2007/0220501 A1* | 9/2007 | Yanagawa | G06F 9/445 717/162 |
| 2007/0285717 A1* | 12/2007 | Muto et al. | 358/1.16 |
| 2010/0214602 A1* | 8/2010 | Moriwaki | 358/1.15 |
| 2011/0119662 A1* | 5/2011 | Chen et al. | 717/168 |
| 2012/0222036 A1* | 8/2012 | Yoshimura | G06F 9/46 718/103 |

\* cited by examiner

IMAGE FORMING APPARATUS AND CONTROL METHOD FOR THE IMAGE FORMING APPARATUS

INCORPORATION BY REFERENCE

This application is based on and claims the benefit of priority from Japanese Patent Application No. 2012-079123 filed on Mar. 30, 2012, the contests of which are hereby incorporated by reference.

BACKGROUND

The present disclosure relates to an image forming apparatus capable of executing a plurality of kinds of jobs and to a control method for the image forming apparatus.

An image forming apparatus includes, for example, storage portions such as a ROM, a RAM and the like connected to a main control portion that controls an entire apparatus. Firmware for executing a job is written in the ROM. And, when power is input into the image forming apparatus, the main control portion reads the firmware written in the ROM and deploys it into the RAM. In this way, a job goes to an executable state.

Here, in an image forming apparatus called a multi-function machine, a plurality of kinds of jobs such, as a copy job, a print job, a scan job, a fax job and the like are executable. As such, in the Image forming apparatus capable of executing the plurality of kinds of jobs, a size the firmware becomes large, because of this, it takes a long time from when power is input to when ail of the plurality of kinds of jobs go to the executable state.

As a method for solving such disadvantages, it is conceivable that a snapshot picked out from an image is written into the ROM when the firmware is deployed in the RAM, and at the next power input time, the snapshot written beforehand in the ROM is deployed into the RAM. In this way, according to the method in which the snapshot written beforehand in the ROM is deployed in the RAM, various processes such as an initialization process and the like become unnecessary. Because of this, it is possible to achieve reduction in the time that is taken from when the power is input to when all of the plurality of kinds of jobs go to the executable state.

However, as for the image forming apparatus capable of executing the plurality of kinds of jobs, there are some users who want to execute the copy job quickly, and there axe other users who want to execute the fax job quickly. For these users, even if the time, which is taken from when the power is input to when all of the plurality of kinds of jobs go to the executable state, is reduced, if the jobs desired by the users are not put into the executable state quickly, it is inconvenient.

SUMMARY

The present disclosure has been made to solve the above problems, and it is an object to provide: an image forming apparatus that is capable of executing a job desired by a user immediately after power is input; and a control method for the image forming apparatus.

To achieve the above object, an image forming apparatus according to the present disclosure includes: a non-volatile storage portion; a priority storage portion; and a volatile storage portion. The non-volatile storage portion stores beforehand each snapshot picked out from a plurality of snapshots which are obtained by dividing an image when firmware for executing a plurality of kinds of jobs is deployed. The priority storage portion stores a priority when putting the plurality of kinds of jobs into an executable state. The operation portion accepts a setting change of the priority to be stored into the priority storage portion. The volatile storage portion, at a power input time, based on the priorities stored in the priority storage portion, acquires and deploys, from the non-volatile storage portion, a snapshot necessary for execution of each job in an order of a highest-priority job to a lowest-priority job, thereby putting first the highest-priority job into the executable state.

DETAILED DESCRIPTION (Whole Structure of Image Forming Apparatus)

First, a whole structure of an image forming apparatus according to a first embodiment of the present disclosure is described.

Figure 1:
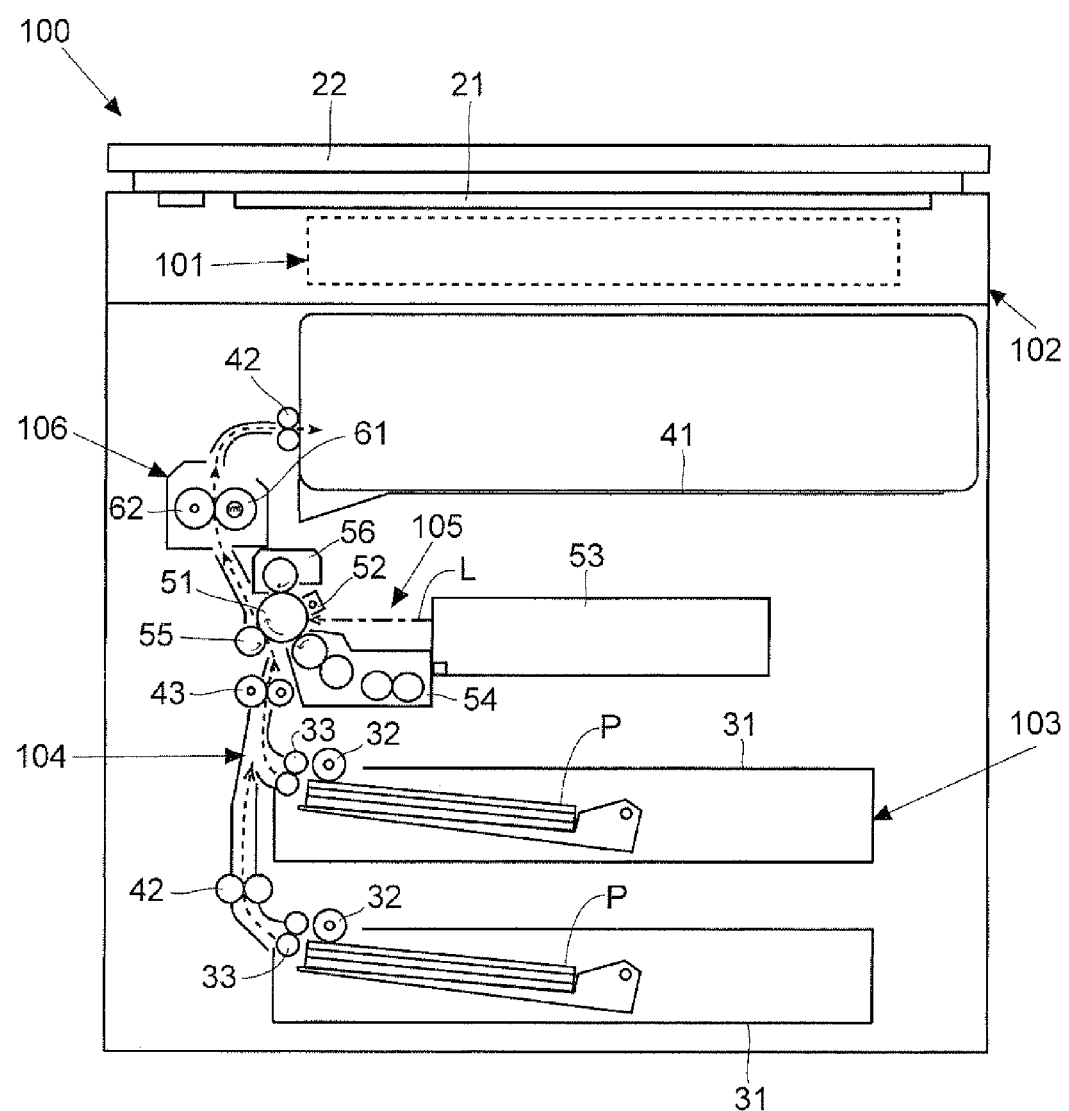
FIG. 1 is a schematic view of an image forming apparatus according a first embodiment of the present disclosure.

As shown in FIG. 1, an image forming apparatus 100 according to the present embodiment is a multi-function machine and is capable of executing a plurality of kinds of jobs such as copying, printing, scanning, fax communicating and the like. And, this image forming apparatus 100 includes: an operation panel 101; an image reading portion 102; a paper sheet supply portion 103; a paper sheet convey portion 104; an image forming portion 105; a fixing portion 106 and the like. In the meantime, there is a case where the paper sheet supply portion 103, the paper sheet convey portion 104, the image forming portion 105, and the fixing portion 106 are collectively called an engine portion.

Figure 2:
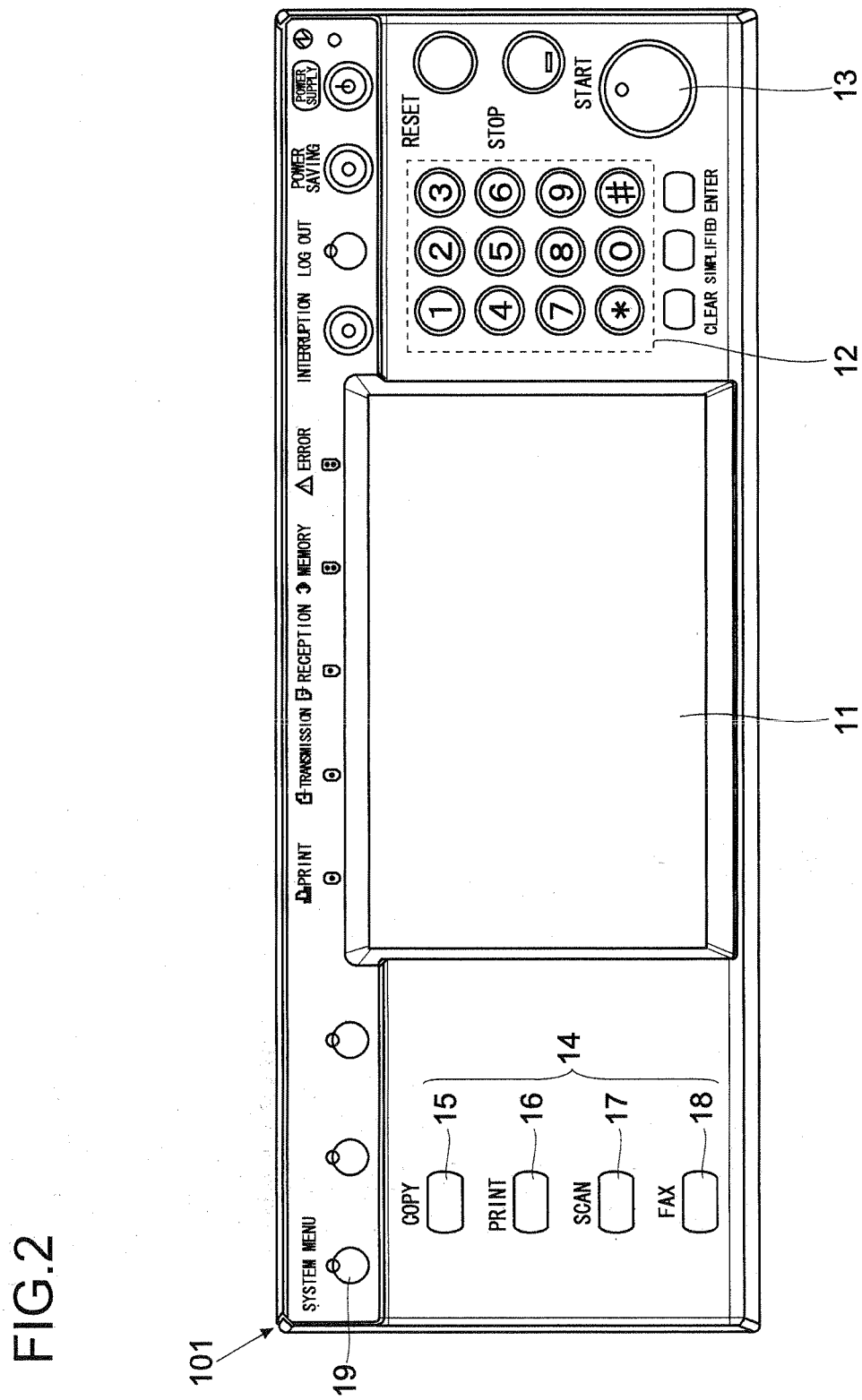
FIG. 2 is a view of an operation panel of the image forming apparatus shown in FIG. 1.

The operation panel 101 is equivalent to an "operation portion" and for example, is disposed on an apparatus front side. This operation panel 101 is, as shown in FIG. 2, provided with a lipoid crystal display portion 11. In the meantime, the liquid crystal display portion 11 has a form in which the display surface is covered by a touch panel. On the liquid crystal display portion 11, setting keys (soft keys) for performing various settings are displayed, also a message and the like for indicating apparatus states are displayed.

Besides, the operation panel 101 is provided with hard keys such as a ten-key pad 12, a start key 13 and the like. The ten-key pad 12 is a hard key for accepting a numerical value input, and the start key 13 is a hard key for accepting a start instruction for execution of each job.

Figure 3:
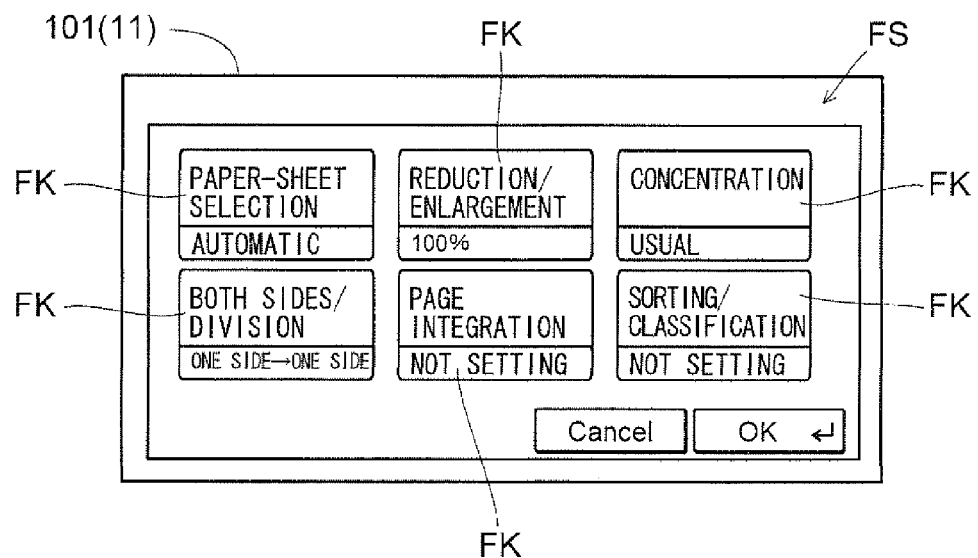
FIG. 3 is a view of a screen (function screen) displayed on the operation panel shown in FIG. 2.

Further, the operation panel 101 is provided with job selection keys 14 (copy key 15, print key 16, scan key 17 and fax key 18) as hard keys. And, when any one of the job selection keys 14 is depressed, the liquid crystal display portion 11, as shown in FIG. 3, displays a function screen FS that corresponds to the depressed job selection key 14. As an example, FIG. 3 shows the function screen FS that is displayed on the liquid crystal display portion 11 in a case where the copy key 15 is depressed, however, also in a case where any one of the print key 16, the scan key 17 and the tax key 18 is depressed, a similar function screen FS is displayed on the liquid crystal display portion 11, For example, on the function screen FS relative to the copy job, a plurality of function setting keys FK are disposed, which are indicated by respective function names such as paper sheet selection, reduction/enlargement concentration, both sides/division, page integration, soring/classification and the like. The plurality of these function setting keys FK are soft keys for selecting functions to be set.

Figure 4:
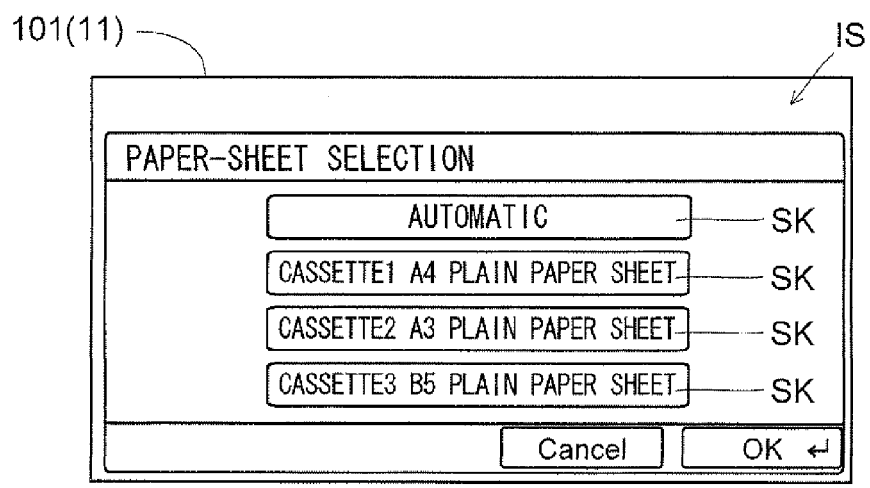
FIG. 4 is a view of a screen (set value input screen) displayed on the operation panel shown in FIG. 2.

On the function screen FS, when any one of the function setting keys FK is depressed, the liquid crystal display portion 11, as shown in FIG. 4, displays a set value input, screen IS that corresponds to the depressed function setting key FK. As an example, FIG. 4 shows the set value Input screen IS in a case where the function setting key FK called "paper sheet selection" is depressed. For example, when a key SK called "cassette 1" is depressed; then the an OK key is depressed, the paper sheet size is set at an A4 size. Besides, the liquid crystal display portion 11 returns the display screen from, the set value input screen IS to the function, screen FS.

And, if the OK key is depressed when the display screen of the liquid crystal display screen is the function setting screen FS, a job is executed based on a set value that is displayed, on the function setting screen FS. Or, also in a case where the start key 13 is depressed, a job is executed based on a set value that is displayed on the function screen FS. In this way, the operation panel 101 accepts an instruction for selecting a job to be executed.

Back to FIG. 1, the image reading portion 102 reads a document to generate image data. Although not shown, the image reading portion 102 is provided with optical members such as a light exposure lamp, a mirror, a lens, an image sensor and the like. This image reading portion 102 casts light onto a document placed on a contact glass 21, and applies A/D conversion to an output value from the image sensor that receives reflected light from the document thereby generating image data. In this way, it is possible to perform printing based on the image data obtained by the document reading operation by the image reading portion 102. Besides, it is also possible to accumulate me image data obtained by the document reading operation, by the image reading portion 102. In the meantime, during the time of the document reading by the image reading portion 102, it is possible to keep depressing the document placed on the contact glass 21 by means of a document cover 22.

The paper sheet supply portion 103 has a plurality of cassettes 31 for storing paper sheets P and supplies the paper sheets P stored m the plurality of cassettes 31 to the paper sheet convey portion 104. Besides, the paper sheet supply portion 103 is provided with a pick-up roller 32 for pulling out the stored paper sheets P, a pair of separation rollers 33 for alleviating double supply of the paper sheets P and the like.

The paper sheet convey portion 104 conveys the paper sheet P through a convey route. Specifically, the paper sheet P supplied from the paper sheet supply portion 103 passes, with the aid of the paper sheet convey portion 104, through the image forming portion 105 and the fixing portion 106 in this order to be guided to an ejection tray 41. The paper sheet convey portion 104 is provided with a plurality of pairs of convey rollers 42 for conveying the paper sheet P. Further, also a pair of resistance rollers 43 are disposed, which make the paper sheet P stand by before the image forming portion 105 and send out the paper sheet to the Image forming portion 105 in synchronization with the timing.

The Image forming portion 105 forms a toner image based on the image data and transfers the toner image onto the paper sheet P. The image forming portion 105 includes: a photosensitive drum 51; an electrification device 52; a light exposure device 53; a development device 54; a transfer roller 55; a cleaning device 56 and the like.

As a forming process of the toner image and a transfer process of the toner image, first, the photosensitive drum 51 is driven to rotate, and a surface of the photosensitive dram 51 is electrified to a predetermined potential by the electrification device 52. Besides, the light exposure device 53 outputs a light beam L based on the image data to scan the surface of the photosensitive drum 51. In this way, an electrostatic latent Image is formed on the surface of the photosensitive drum 51. Then, the development device 54 supplies toners to the electrostatic latent image formed on the surface of the photosensitive drum 51 to develop the electrostatic latent image.

At this time, the transfer roller 55 is in tight contact with, the surface of the photosensitive drum 51 to be rotatable. Further, a predetermined voltage is applied to the transfer roller 55. In this state, the pair of resistance rollers 43 counts the timing and males the paper sheet P go between the transfer roller 55 and the photosensitive drum 51. In this way, the toner image on the surface of the photosensitive drum 51 is transferred, onto the paper sheet P. In the meantime, when the transfer process of the toner image ends, the cleaning device 56 removes toners and the like remaining on the surface of the photosensitive drum 51.

The fixing portion 106 heats, pressurizes and fixes the toner image translated to the paper sheet P. This fixing portion 106 includes: a heat roller 61 incorporating a heat source; and a pressure roller 62 pressurized to the heat roller 61. And, the paper sheet P to which the toner image Is transferred passes through between the heat roller 61 and the pressure roller 62 to be heated and pressurized. In this way, the toner image is fixed onto the paper sheet P.

(Hardware Structure of the Image Forming Apparatus)

Next, a hardware structure of the image forming apparatus 100 is described.

Figure 5:
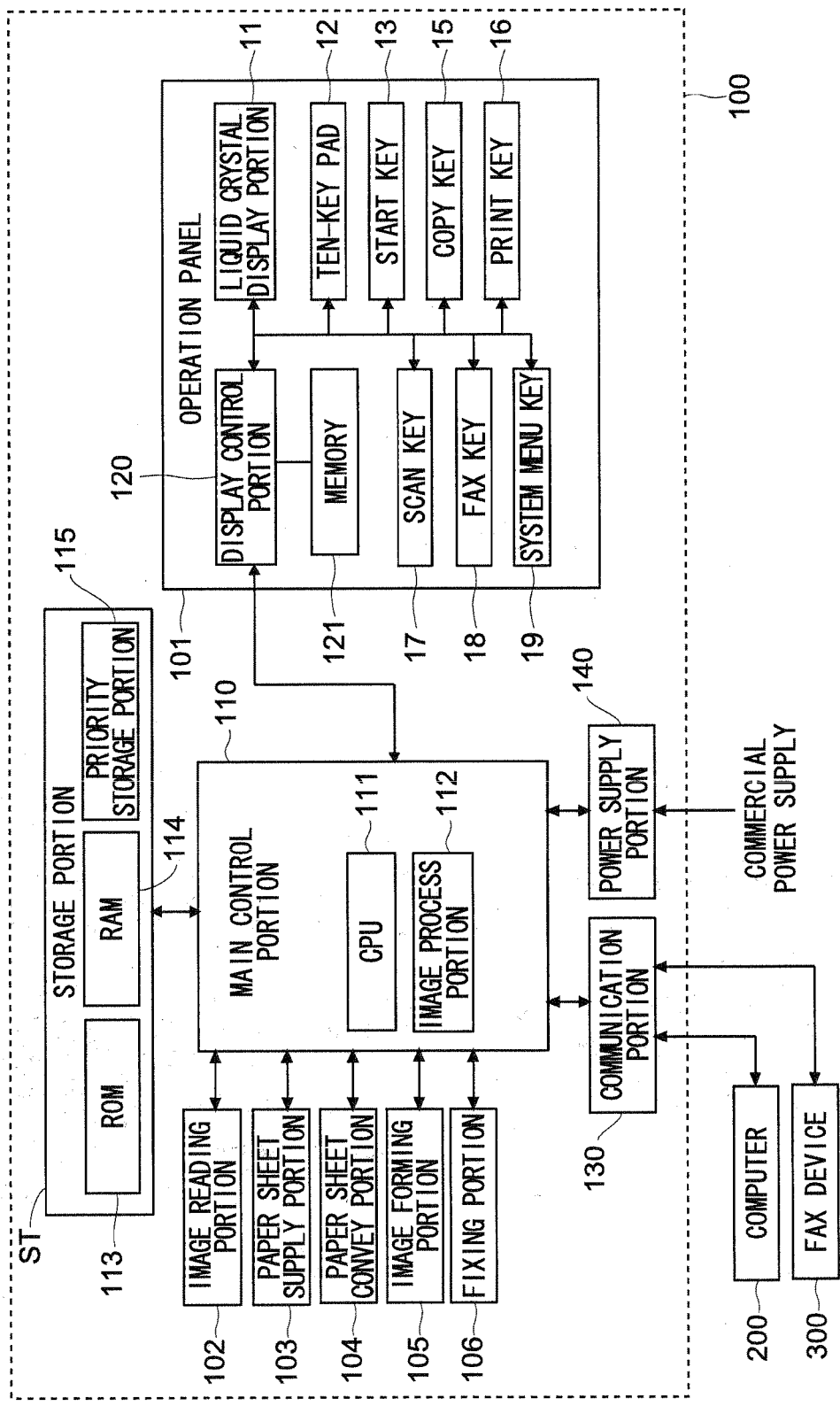
FIG. 5 is a view for describing a hardware structure of the image forming apparatus shown in FIG. 1.

As shown in FIG. 5, the image forming apparatus 100 includes a main control, portion 110. This main control portion 110 includes: a CPU 111 that is a central processing unit; and an image process portion 112, and is connected to a storage portion ST that includes a ROM 113 (which is equivalent, to a "non-volatile storage portion"), a RAM 114 (which is equivalent to a volatile storage portion) and the like.

Besides, the main control portion 110 is connected: to the image reading portion, the paper sheet supply portion 103, the paper sheet convey portion 104, the image forming portion 105, the fixing portion 106 and the like. And, the main control portion 110 performs overall control, image process control drive control of a motor for rotating various rotary members and the like. The main control portion 110 may be divided in: a control portion for performing the overall control and image process control; and a control portion for performing the drive control of the motor.

The operation panel 101 is provided with a display control portion 120 connected to the main control portion 110. This display control portion 120 includes a CPU and the like, receives an instruction from the main control portion 110 to perform display control. For example, when the soft key displayed on the liquid crystal display portion 11 is depressed, the display control portion 120 receives an output front the touch panel to pinpoint coordinates of the depressed position. Data indicating a relationship between the output from the touch panel and the coordinates of the depressed position are stored into a memory 121 and the like.

Besides, the main control portion 110 is connected to a communication portion 130. For example, the communication portion 130 is communicably connected to an external computer 200 via a network. In this way, it is possible to perform printing based on image data transmitted from the computer 200 and also to transmit the image data, which are obtained by the document reading operation of the image, reading portion 102, to the computer 200. Besides, the communication portion 130 may incorporate a modem and the like, and in this case, is able to perform fax communication with an external fax device 300 via a network such as a telephone line and the like.

Besides, the main control portion 110 is connected to a power supply portion 140. The power supply portion 140 is connected to a commercial power supply and generates a voltage necessary to drive portions of the apparatus. And, when in a usual mode, the power supply portion 140 supplies power to all the portions of the apparatus (performs usual power supply). On the other hand, when moving front the usual mode to a power saving mode, the power supply portion 140 supplies power to only part of the portions of the apparatus and stops the power supply to the other portions (limits the power supply compared with the usual mode).

The moving from the usual mode to the power saving mode is performed by the main control portion 110 giving an instruction to the power supply portion 140. For example, the main control portion 110 counts an unused time span that passes with the apparatus unused, if the unused time span exceeds a predetermined time span, makes the power supply portion 140 perform the power supply to only part of the portions of the apparatus, thereby performing the moving from the usual mode to the power saving mode. Or, also in a case where the operation panel 101 accepts a moving instruction for moving from the usual mode to the power saving mode, the main control portion 110 performs the moving From the usual mode to the power saving mode. And, if the power supply portion 140 receives a signal from a return condition detection portion which indicates that a return condition for returning from the power saving mode to the usual mode is satisfied, the power supply portion 140 resumes the power supply to all me portions of the apparatus, thereby performing the return from the power saving mode to the usual mode.

For example, when moving from the usual mode to the power saving mode, the power supply portion 140 stops the power supply to the engine portion (paper sheet supply portion 103, paper sheet convey portion 104, image forming portion 105 and fixing portion 106) ant the storage portion ST (ROM 113 and RAM 114) and the like. However, the power supply portion 140 receives the signal, which indicates that the return condition for returning from the power saving mode to the usual mode is satisfied, from the return condition detection portion, accordingly, even in the power saving mode, the power supply portion 140 continues the power supply to the return condition, detection portion.

As a portion equivalent to the return condition detection portion, there is the operation panel 101. For example, the operation panel 101, upon being operated by a user during the power saving mode, transmits the signal, which indicates that the return, condition for returning from the power saving mode to the usual mode is satisfied, to the power supply portion 140. And, the power supply portion 140, upon receiving the signal from the operation panel 101 during the power saving mode, performs the return from the power saving mode to the usual mode.

Besides, the communication portion 130 also functions as the return condition detection portion. Specifically, the communication portion 130, upon receiving data from the eternal apparatuses such as the computer 200, the fax device 300 and the like, transmits the signal, which indicates that the return condition for returning from the power saving mode to the usual mode is satisfied, to the power supply portion 140. And, the power supply portion 140, upon receiving the signal from the communication portion 130 during the power saving mode, performs the return from the power saving mode to the usual mode.

Further, although, not shown, also m open/close detection sensor for detecting open/close of the document cover 22 and a mount/demount detection sensor for detecting mount/demount of the cassette 31 and the like function as the return condition detection portion.

(Software Structure of the Image Forming Apparatus)

Next, a software structure of the image forming apparatus 100 is described.

Figure 6:
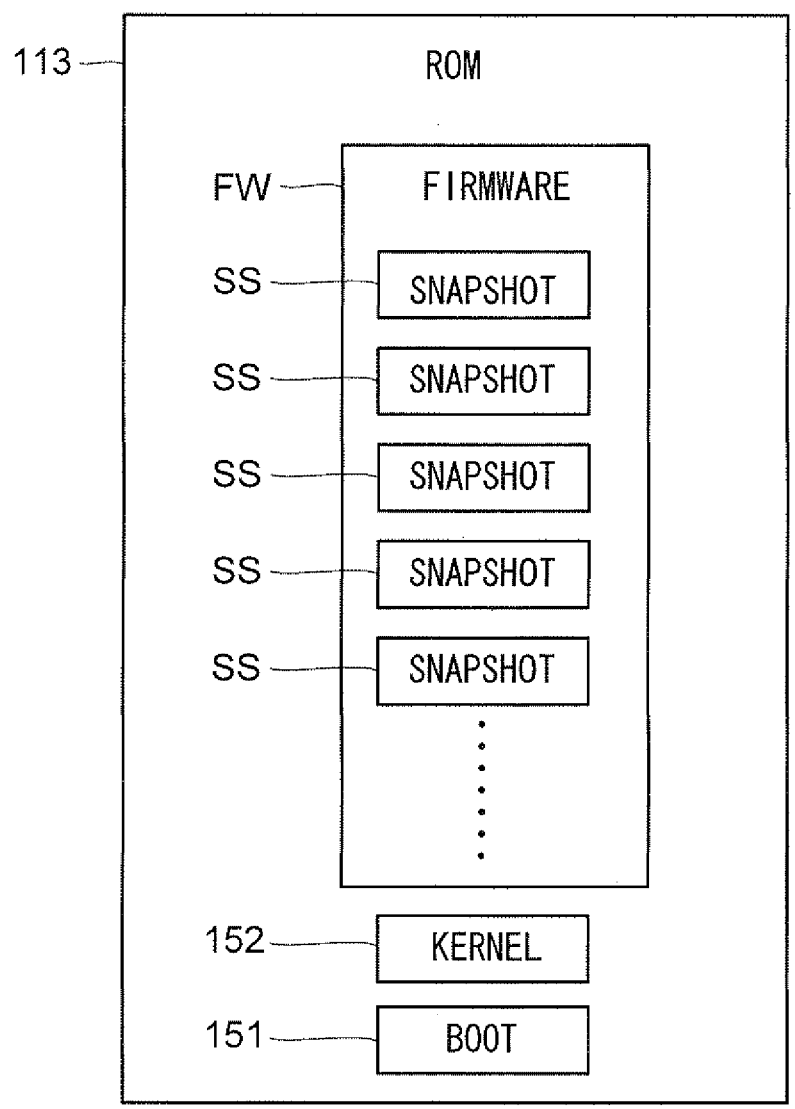
FIG. 6 is a view for describing a software structure of the image forming apparatus shown in FIG. 1.

In the present embodiment, as shown in FIG. 6, the ROM 13 stores beforehand each snapshot SS picked out from, a plurality of snapshots which are obtained by dividing an image when the firmware FW (a group of components) for executing the plurality of kinds of jobs is deployed in the RAM 114. For example, the ROM 113 stores the snapshot SS obtained by the division performed in component units.

Here, the component is a part of a program that has a specific function, however, the function is not achievable by the component alone, but achievable by a combination of the component and other components. For example, the copy job is achieved by a combination, of two or more components of a plurality of components that compose the firmware FW such as a component for controlling the document reading, a component for controlling a shading correction and the like for the image data obtained by the document reading, a component tor controlling the drive of various rotary members of the engine portion and the like. Besides, also the print job, the scan job and the fax job are each achieved by a combination of two or more components of the plurality of components that compose the firmware FW.

In the meantime, of all the components that compose the firmware FW, only the snapshots SS of components except for part (e.g., a component for controlling a special function that has a low use frequency) may be stored beforehand in the ROM 113, or the snapshots of all the components that compose the firmware FW may be stored beforehand in the ROM 113. Besides, compressed firmware may be stored beforehand in the ROM 113.

Besides, the ROM 113 stores a boot program 151 for performing a startup (restart) of a system, a kernel 152 defining a core portion of an operating system (OS) and the like. And, when power is input into the image forming apparatus 100 (or a restart is performed), the main control portion 110 performs the startup process. Specifically, the main control portion 110 reads the kernel 152 into the RAM 114 in accordance with the boot program 151 stored in the ROM 113 and starts up the OS. Then, the main control portion 110 reads the plurality of snapshots SS and deploy them into the RAM 114. In other words, the RAM 114 acquires the plurality of snapshots SS from the ROM 114 and deploy them at the power input time.

(Priority when Deploying the Plurality of Snapshots into the RAM)

Next, priorities when deploying the plurality of snapshots SS into the RAM 114 are described.

For example, the storage portion ST includes a priority storage portion 115 (see FIG.) that stores priorities when putting a plurality of kinds of jobs into the executable state. In the meantime, the priorities when putting the plurality of kinds of jobs into the executable state may be stored into the ROM 113 (the ROM 113 may function as the priority storage portion). And, when power is input into the image forming apparatus 100, based on the priorities stored in the priority storage portion 115, the main control portion 110 deploys preferentially the snapshot SS necessary for execution of the highest-priority job into the RAM 114. In other words, based, on the priorities stored in the priority storage portion 115, the RAM 114 preferentially acquires the snapshot SS necessary for the execution of the highest-priority job from the ROM 113 and deploys the snapshot.

Figure 7:
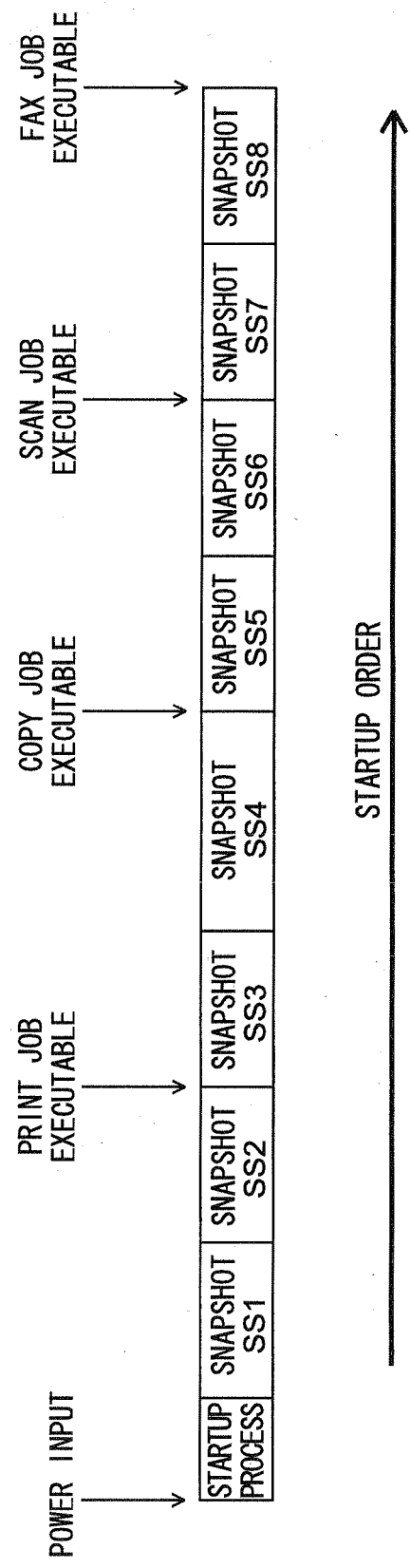
FIG. 7 is a view for describing an order in which a plurality of kinds of jobs go to an executable state in the image forming apparatus shown in FIG. 1.

For example, it is assumed that priorities are beforehand set such, that each job is put into the executable state in an order of the print job→copy job→scan job→fax job. In this case, as shown in FIG. 7, first, the main control portion 110 performs the startup process. And, the main control portion 110 deploys preferentially the snapshot SS (e.g., snapshot SS1 and snapshot SS2) necessary for the execution of the highest-priority print job Into the RAM 114. In this way, the print job is preferentially put into the executable state.

Then, the main control portion 110 deploys the remaining snapshots SS into the RAM 114 in an higher-priority order. Specifically, after deploying the snapshots SS1 and SS2 necessary for the execution of the print job into the RAM 114, the main control portion 110 deploys the snapshot SS necessary for the execution of the copy job into the RAM 114.

Here, for example, it is assumed that the snapshots SS necessary for the execution of the copy job are the snapshots SS1, SS3 and SS4. In this case, the snapshot SS1 is already deployed in the RAM 114 to preferentially put the print job in the executable state. Specifically, at the time the snapshots SS1 and SS2 necessary for the execution of the print job are deployed into the RAM 114, the snapshots SS necessary for the execution of the copy job are the snapshots SS3 and SS4. Accordingly, the main control portion 110 deploys the snapshots SS1 and SS2 necessary for the execution of the print job into the RAM 114, then, deploys the remaining snapshots SS3 and SS4 necessary for the execution of the copy job into the RAM 114.

Thereafter, the main control portion 110 deploys the snapshot SS necessary for the execution of each job into the RAM 114 in the order of the scan job to the Fax job. For example, it is assumed that at the time the snapshot SS necessary for the execution of the copy job is deployed into the RAM 114, the remaining snapshots SS necessary for the execution of the scan job are snapshots SS5 and SS6; and at the time the snapshot SS necessary for the execution of the scan job is deployed into the RAM 114, the remaining snapshots SS necessary for the execution of the fee job are snapshots SS7 and SS8. In this case, the main control portion 110 deploys the snapshots SS5, SS6, SS7 and SS8 into the RAM 114 in this order.

As described above, at the power input time, based on the priorities stored in the priority storage portion 115, the main control portion 110 deploys, in the RAM 114, the snapshot SS necessary for the execution of each job in the order of the highest-priority job to the lowest-priority job. In this way, all the jobs of the print job, copy job, scan job and fax job go to the executable state. Specifically, at the power input time, based on the priorities stored in the priority storage portion 115, the RAM 114 acquires and deploys the snapshot SS necessary for the execution of each job in the order of the highest-priority job to the lowest-priority job, thereby putting first the highest-priority job into the executable state.

(Priority Setting Method)

Next, a method for setting the priority is described.

Figure 8:
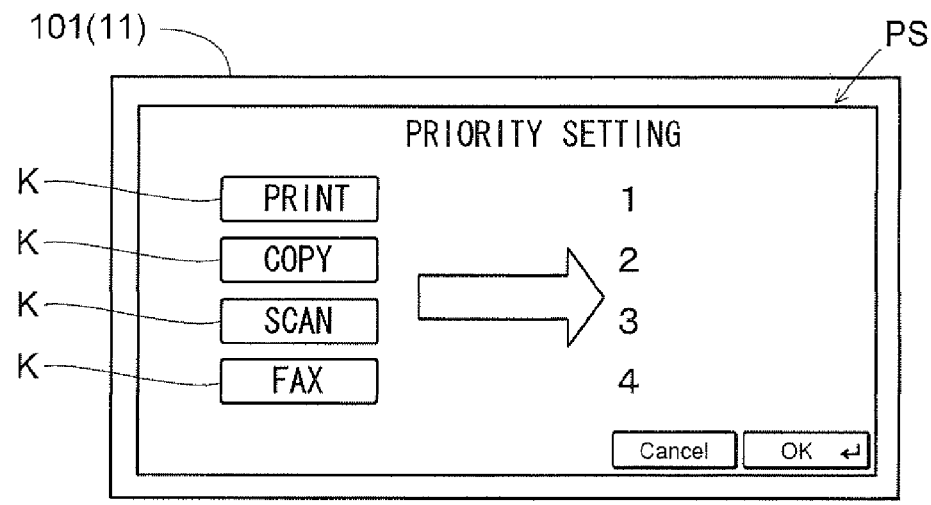
FIG. 8 is a view of a screen (priority setting screen) displayed on the operation panel shown in FIG. 2.

The operation panel 101 accepts the priority setting. For example, the operation panel 101, when accepting the priority setting, displays a priority setting screen PS shown in FIG. 8. In the meantime, if a system menu key 19 (see FIG. 2) is depressed and an item relative to the setting of a preferential job is selected from a menu screen (not shown) displayed at that time, the operation panel 101 displays the priority setting screen PS.

Figure 9:
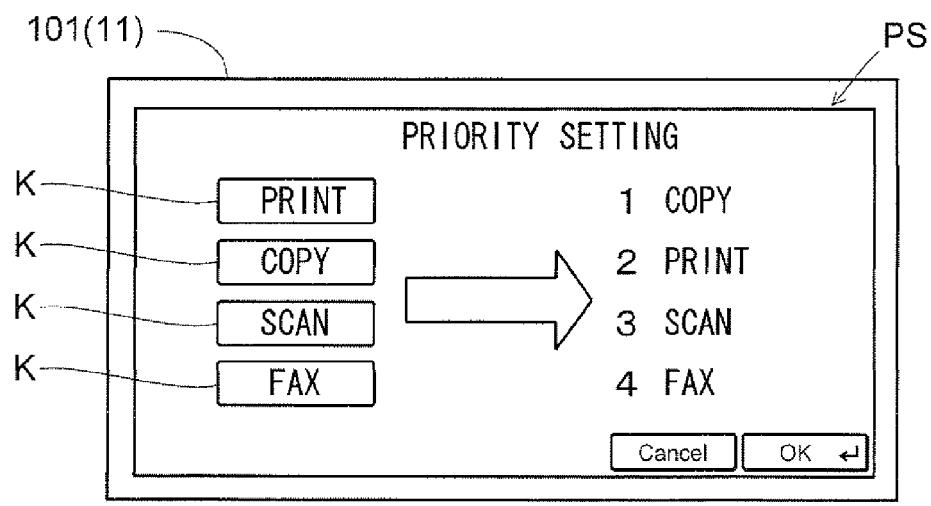
FIG. 9 is a view of a screen (priority setting screen) displayed on the operation panel shown in FIG. 2.

On the priority setting screen PS, a plurality of priority setting keys K indicated, by respective names of the plurality of kinds of jobs am disposed. And, by successively depressing the plurality of priority setting keys K, it is possible to perform a setting change of the preferential job. For example, in a case where the respective priority keys K are depressed in the order of the copy job, print job, scan job and fax job, the operation, panel 101 ranges and displays the respective names of the plurality of kinds of jobs in accordance with the depressing order (see FIG. 9). Thereafter, the OK is depressed, whereby the priorities displayed on the priority setting screen PS are stored into the priority storage portion 115.

For example, it is assumed that a setting change is performed front priorities shown in FIG. 7 to priorities such that the respective jobs go to the executable state in the order of the copy job→print job→scan job→fax job. In this case, the main control portion 110 performs the startup process, then, deploys preferentially the snapshots SS (i.e., snapshots SS1, SS3 and SS4) necessary for the execution of the highest-priority copy job into the RAM 114. In this way, the copy job preferentially goes to the executable state.

Likewise, if the preferential job is changed to the scan job, the main control portion 110 performs the startup process, then, deploys preferentially the snapshot SS necessary for the execution of the highest-priority scan job into the RAM 114. Besides, if the preferential job is changed to the fax job, the main control portion 110 performs the startup process, then, deploys preferentially the snapshot SS necessary for the execution of the highest-priority fax job into the RAM 114.

In the meantime, there is a case where at the time of power input Into the image forming apparatus 100, the job selection key (any one of the copy key 15, print key 16, scan key 17, and fax key 18) of the operation panel 101 is depressed. As described above, in the case where the job selection key 14 of the operation panel 101 is depressed at the power input time, the main control portion 110 deploys preferentially the snapshot SS necessary for the execution of the selected job (job that corresponds to the depressed job selection key 14) into the RAM 114. Specifically, in the case where the job selection key 14 is depressed at the power input time, the RAM 114 acquires preferentially the snapshot SS necessary for the execution of the selected job from the ROM 113 and deploys the snapshot. Thereafter, the main control portion 110 deploys the snapshot SS necessary for the execution of each job into the RAM 114 in the order of a higher-priority job to a lowest-priority job of the remaking jobs that are not selected.

(Flow in which the Plurality of Kinds of Jobs go to the Executable State)

Figure 10:
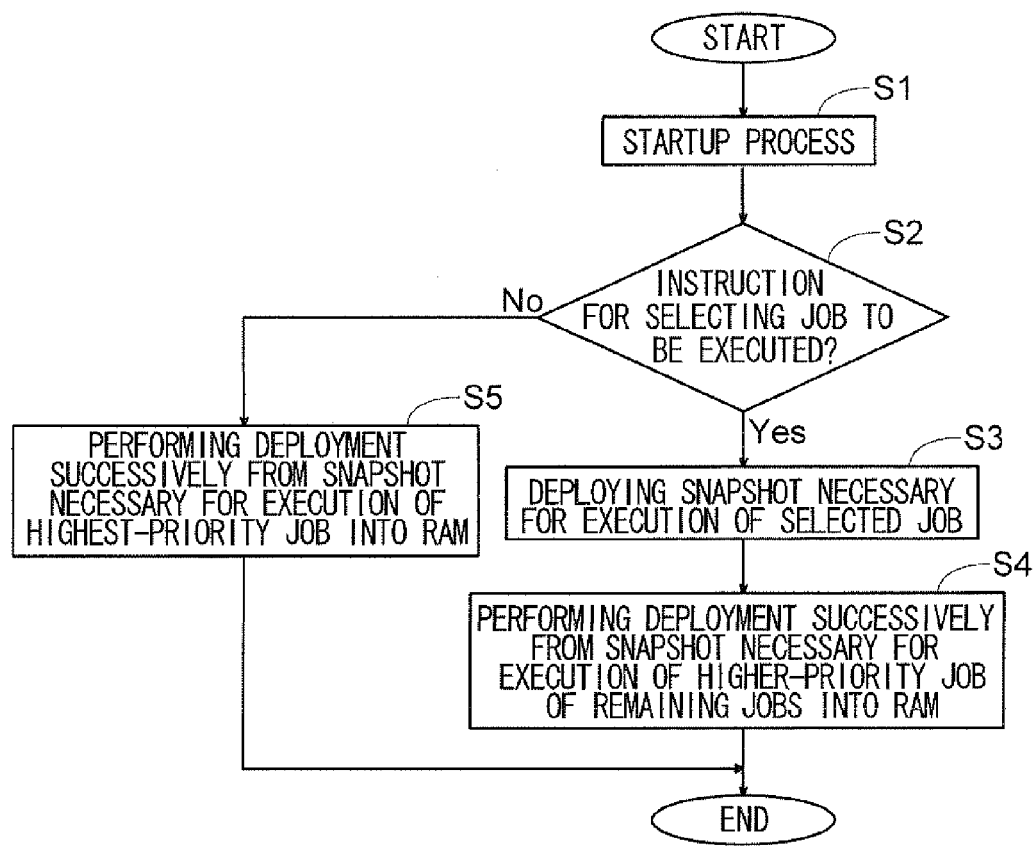
FIG. 10 is a view for describing a flow in which a plurality of kinds of jobs go to an executable state after power is input into the image forming apparatus shown in FIG. 1.

Next, a flow, in which the plurality of kinds of jobs go to the executable state, is described along a flow chart shown in FIG. 10.

First, a start time of the flow chart in FIG. 10 is the time when power is input into the image forming apparatus 100 or the time when the power saving mode is switched to the usual mode.

In a step S1, the main control portion 110 performs the startup process. Then, in a step S2, the main control portion 110 determines whether an instruction for selecting a job to be executed is received or not. Specifically, the main control portion 110 determines whether the job selection key 14 (any one of the copy key 15, print key 16, scan key 17, and fax key 18) of the operation panel 101 is depressed or not. As a result of the determination, if the selection instruction is received, the control goes to a step S3.

Going to the step S3, the main control, portion 110 deploys preferentially the snapshot SS necessary for the execution of the selected job (job that corresponds to the depressed job selection key 14) into the RAM 114. Thereafter, in a step S4, based on the priorities stored in the priority storage portion 115, the main control portion 110 performs the deployment successively from the snapshot SS necessary for the execution, of the highest-priority job of the not-selected remaining jobs into the RAM 114.

On the other hand, in the step S2, in a case where the instruction for selecting the job to be executed is not received, the control goes to a step S5. Going to the step S5, based on the priorities stored in the priority storage portion 115, the main control portion 110 performs the deployment successively from the snapshot SS necessary for the execution of the highest-priority job into the RAM 114.

In the present embodiment, as described above, the ROM 113 (non-volatile storage portion) stores beforehand each snapshot SS picked out from the plurality of snapshots which are obtained by dividing the image when the firmware FW for executing the plurality of kinds of jobs is deployed. Besides, at the power input time, based on the priorities stoned in the priority storage portion 115, the RAM 114 acquires the snapshot SS necessary for the execution of each job from the ROM 113 and deploys the snapshot in the order of the highest-priority job to the lowest-priority job, thereby putting first the highest-priority job into the executable state. Here, the operation panel 101 (operation portion) accepts the setting change of the priority to be stored into the priority storage portion 115, Because of this, if the operation panel 101 accepts beforehand the setting change of the priority from the user, at the power input time, it is possible to put first a job desired by the user into the executable state. In this way, for the user, the job desired by the user goes to the executable state immediately after the power input, which is accordingly convenient.

In the meantime, the snapshot SS stored in the ROM 113 is a snapshot obtained by picking out from the plurality of snapshots which are obtained by dividing the image when the firmware FW is deployed (the entire image when the firmware FW is deployed is not picked out as a single one). Because of this, even if the setting change of the priority is performed, it is possible to select and read, from the ROM 13, the snapshot SS for each job that is necessary for the execution of each job.

Besides, in the present embodiment, as described above, the operation panel 101 has the job selection keys 14 (copy key 15, print key 16, scan key 17, and fax key 18) that accept the instruction for selecting the job to be executed; in the case where the job selection key 14 is depressed at the power input time, the RAM 114 acquires and deploys preferentially the snapshot SS necessary for the execution of the selected job. In this way, for the user, even if the setting change of the priority is not performed beforehand, it is possible to execute the job desired by the user immediately after the power input, which is accordingly convenient.

In this case, it is preferable that the RAM 114 acquires and deploys preferentially the snapshot SS necessary for the execution, of the selected job; then, based on the priorities stored in the priority storage portion 115, acquires the snapshot SS necessary for the execution of each job from the ROM 113 and deploys the snapshot in the order of a higher-priority job to a lower-priority job of the not-selected remaining jobs. In this way, the not-selected remaining jobs automatically go to the executable state in an order desired by the user, which is convenient for the user.

Besides, in the present embodiment, as described above, the power supply portion 140 is provided, which in the usual mode, performs the usual power supply to the RAM 114; in the power saving mode which limits the power supply compared with the usual mode, stops the power supply to the RAM 114. And, upon moving from the power saving mode to the usual mode, based on the priorities stored in the priority storage portion 115, the RAM 114 acquires the snapshot SS necessary for the execution of each job from the ROM 113 and deploys the snapshot in the order of the highest-priority job to the lowest-priority job. In this way, upon moving from the power saving mode to the usual mode, it is possible to immediately put the job desired by the user into the executable state.

It should be understood that the embodiment disclosed this time is an example in all respects and is not limiting. The scope of the present disclosure is not indicated by the above description of the embodiment but by the claims, and all modifications within the scope of the claims and the meaning equivalent, to the claims are covered.

What is claimed is:

1. An image forming apparatus comprising:
a non-volatile storage portion that stores beforehand each snapshot picked out from a plurality of snapshots which are obtained by dividing an image in component units when firmware for executing a plurality of kinds of jobs is deployed;
a priority storage portion that stores priorities when putting the plurality of kinds of jobs into an executable state;
an operation portion that accepts a setting change of the priority to be stored into the priority storage portion; and
a volatile storage portion that at a power input time, based on the priorities stored in the priority storage portion, acquires and deploys, from the non-volatile storage portion, a snapshot necessary for execution of each job in an order of a highest-priority job to a lowest-priority job, thereby putting first the highest-priority job into the executable state, wherein:
the plurality of kinds of jobs include a copy job, a print job, a scan job and a fax job;
the operation portion has a job selection key for accepting an instruction for selecting a job to be executed and a plurality of priority setting keys;
the job selection key includes a copy key for selecting the copy job, a print key for selecting the print job, a scan key for selecting the scan job, and a fax key for selecting the fax job;
the plurality of priority setting keys include a first priority setting key for deciding a priority of the copy job, a second priority setting key for deciding a priority of the print job, a third priority setting key for deciding a priority of the scan job, and a fourth priority setting key for deciding a priority of the fax job;

the priorities stored in the priority storage are decided based on depression of the first to fourth priority setting keys;

each of the plurality of kinds of jobs is a job that is achieved by a combination of two or more program parts of a plurality of program parts obtained by dividing the firmware in component units;

each of the plurality of program parts is stored, as a snapshot, in the non-volatile storage potion; and in a case where a snapshot of a program part identical to a snapshot of a program part necessary for execution of a predetermined job exists in snapshots of two or more program parts necessary for execution of a job of the copy job, the print job, the scan job and the fax job that is put in an executable state prior to the predetermined job, when putting the predetermined job into an executable state, the volatile storage portion obtains, from the non-volatile storage portion, a remaining snapshot of a program part of snapshots of two or more program parts necessary for the execution of the predetermined job, other than the snapshot of the identical program part, and deploys the remaining snapshot, and in a case where at least one of the copy key, the print key, the scan key, and the fax key is depressed at a power input time, the volatile storage portion preferentially acquires and deploys the snapshot necessary for the execution of the selected job, and thereafter, based on the priorities stored in the priority storage portion, from the non-volatile storage portion, the volatile storage portion acquires the snapshot necessary for the execution of each job and deploys the snapshot in an order of a higher-priority job to a lower-priority job of remaining jobs that are not selected.

2. The image forming apparatus according to claim 1, further comprising a power supply portion that performs usual power supply to the volatile storage portion in a usual mode, stops the power supply to the volatile storage portion in a power saving mode for limiting the power supply compared with the usual mode, wherein when the power saving mode is moved to the usual mode, based on the priorities stored in the priority storage portion, the volatile storage portion acquires the snapshot necessary for the execution of each job from the non-volatile storage portion and deploys the snapshot in the order of the highest-priority job to the lowest-priority job.

3. A control method for an image forming apparatus that includes: a priority storage portion that stores priorities when putting a plurality of kinds of jobs into an executable state; and an operation portion that accepts a setting change of the priority which is stored into the priority storage portion, the control method comprising:

a step for performing a startup process; and a step for, from a non-volatile storage portion that stores beforehand each snapshot picked out from a plurality of snapshots which are obtained by dividing an image when firmware for executing the plurality of kinds of jobs is deployed, acquiring and deploying a snapshot necessary for execution of each job in an order of a highest-priority job to a lowest-priority job based on the priorities stored in the priority storage portion, thereby putting first the highest-priority job into the executable state, wherein:

the plurality of kinds of jobs include a copy job, a print job, a scan job and a fax job;

the operation portion has a job selection key for accepting an instruction for selecting a job to be executed and a plurality of priority setting keys;

the job selection key includes a copy key for selecting the copy job, a print key for selecting the print job, a scan key for selecting the scan job, and a fax key for selecting the fax job;

the plurality of priority setting keys include a first priority setting key for deciding a priority of the copy job, a second priority setting key for deciding a priority of the print job, a third priority setting key for deciding a priority of the scan job, and a fourth priority setting key for deciding a priority of the fax job;

the priorities stored in the priority storage are decided based on depression of the first to fourth priority setting keys;

each of the plurality of kinds of jobs is a job that is achieved by a combination of two or more program parts of a plurality of program parts obtained by dividing the firmware in component units;

each of the plurality of program parts is stored, as a snapshot, in the non-volatile storage potion; and in a case where a snapshot of a program part identical to a snapshot of a program part necessary for execution of a predetermined job exists in snapshots of two or more program parts necessary for execution of a job of the copy job, the print job, the scan job and the fax job that is put in an executable state prior to the predetermined job, when putting the predetermined job into an executable state, the volatile storage portion obtains, from the non-volatile storage portion, a remaining snapshot of a program part of snapshots of two or more program parts necessary for the execution of the predetermined job, other than the snapshot of the identical program part, and deploys the remaining snapshot, and in a case where at least one of the copy key, the print key, the scan key, and the fax key is depressed at a power input time, the volatile storage portion preferentially acquires and deploys the snapshot necessary for the execution of the selected job, and thereafter, based on the priorities stored in the priority storage portion, from the non-volatile storage portion, the volatile storage portion acquires the snapshot necessary for the execution of each job and deploys the snapshot in an order of a higher-priority job to a lower-priority job of remaining jobs that are not selected.

\* \* \* \* \*